United States Patent [19]

Graham et al.

[11] Patent Number: 4,654,389

[45] Date of Patent: Mar. 31, 1987

[54] ADHESIVE COMPOSITIONS OF ETHYLENE-UNSATURATED CARBOXYLIC ACID COPOLYMERS

[75] Inventors: Stephen L. Graham, Richwood; David O. Plunkett, Lake Jackson, both of Tex.

[73] Assignee: The Dow Chemical Company, Midland, Mich.

[21] Appl. No.: 734,639

[22] Filed: May 15, 1985

Related U.S. Application Data

[63] Continuation-in-part of Ser. No. 640,486, Aug. 13, 1984, abandoned.

[51] Int. Cl.[4] .................. C08L 23/08; C08L 33/02; C08L 13/04
[52] U.S. Cl. ........................... 524/272; 524/270; 525/210; 525/221
[58] Field of Search ............. 524/270; 525/270, 221, 525/222, 210

[56] References Cited

U.S. PATENT DOCUMENTS

| | | | |
|---|---|---|---|
| 3,448,178 | 6/1969 | Flanagan | 260/23 |
| 3,485,783 | 12/1969 | Kehe | 260/27 |
| 3,487,036 | 12/1969 | Bissot | 260/27 |
| 3,620,878 | 11/1971 | Guthrie | 156/309 |
| 3,823,108 | 7/1974 | Bissot | 260/27 R |
| 3,853,606 | 12/1974 | Parkinson | 260/27 |
| 3,869,416 | 3/1975 | Hoh | 260/27 R |
| 3,912,674 | 10/1975 | Stahl | 260/23 AR |
| 4,018,732 | 4/1977 | Lakshmanan | 260/27 R |
| 4,132,690 | 1/1979 | Eernstman et al. | 260/23 AR |
| 4,169,116 | 9/1979 | Trotter et al. | 525/210 |
| 4,252,858 | 2/1981 | Chao et al. | 525/199 |
| 4,283,317 | 8/1981 | Murphy et al. | 156/327 |
| 4,284,541 | 8/1981 | Takeda et al. | 525/73 |
| 4,284,542 | 8/1981 | Boyce et al. | 525/176 |
| 4,289,669 | 9/1981 | Lakshmanan | 525/333 |
| 4,324,871 | 4/1982 | Acharya et al. | 525/149 |
| 4,325,853 | 4/1982 | Acharya et al. | 524/272 |
| 4,328,141 | 5/1982 | Farewell et al. | 524/272 |
| 4,359,552 | 11/1982 | Acharya et al. | 525/193 |
| 4,367,113 | 1/1983 | Karim et al. | 524/187 |

FOREIGN PATENT DOCUMENTS

| | | | |
|---|---|---|---|
| 57-57769 | 4/1982 | Japan | 524/472 |
| 58-80370 | 5/1983 | Japan | 524/472 |

OTHER PUBLICATIONS

Kirk–Othmer Encyclopedia of Chemical Technology, 2d ed., vol. 17, pp. 475–508 (1968).

*Primary Examiner*—Allan M. Lieberman

[57] ABSTRACT

Hot melt adhesive compositions consisting essentially of (a) a copolymer of ethylene and at least one unsaturated carboxylic acid such as acrylic or methacrylic acid, the copolymer containing from 12% to about 30% by weight of the acid; and (b) a tackifier which is compatible with the copolymer and which imparts adhesive strength to the composition when it is applied as a hot melt to a substrate of aluminum, glass, nylon, galvanized steel, polypropylene, polyvinyl chloride or polyacrylonitrile-butadiene-styrene, the tackifier being selected from the group consisting of: (i) rosins having an acid number of at least about 80 and rosins diluted with an aromatic hydrocarbon resin to have an acid number above approximately 80, and (ii) terpene resins.

19 Claims, No Drawings

ADHESIVE COMPOSITIONS OF ETHYLENE-UNSATURATED CARBOXYLIC ACID COPOLYMERS

This application is a continuation-in-part of our earlier application Ser. No. 640,486, filed on Aug. 13, 1984, now abandoned.

FIELD OF THE INVENTION

This invention relates to hot melt adhesive compositions of copolymers of ethylene and unsaturated carboxylic acids, and more particularly, to such adhesive compositions in which the copolymer has a high content of acid. Still more particularly, this invention relates to such adhesive compositions which exhibit improved utility as hot melt adhesives for bonding difficult-to-bond substrates.

BACKGROUND OF THE INVENTION

Hot melt adhesives are generally a solid thermoplastic material which quickly melts upon heating and then sets to a firm bond on cooling. In contrast to most other types of adhesives which typically set by evaporation of a solvent or emulsion medium, hot melt adhesives are generally homogenous mixtures. In the manufacture of hot melt adhesives, a thermoplastic material is typically compounded (e.g., melt blended) with one or more tackifiers, waxes, antioxidants and/or other stabilizing additives, and then cooled to form rods, pellets, chicklets, bricks or the like for sale to an end user. In the use of hot melt adhesives, the rods, pellets, chicklets, bricks or the like are typically heated in a reservoir at about 120°-250° C. (and often kept at this temperature in the reservoir for 24 hours or more) from which it is supplied to a substrate by pumping or pressure extrusion through nozzles or slot dies. In contrast to the solvent or emulsion type adhesive which requires time for the evaporation of the solvent or emulsion medium, an almost instantaneous bonding can be obtained with hot melt adhesives.

The use of thermoplastic ethylene polymers in hot melt adhesive compositions is well known. For example, in U.S. Pat. No. 3,485,783 there is described a hot melt adhesive composition containing at least 40% by weight of a polymerized rosin ester tackifier and at least 25% of a copolymer of ethylene and acrylic acid or alkyl acrylate. However, in such adhesive compositions it has heretofore been necessary to limit the acrylic acid content of the copolymers to twelve percent by weight or less because of compatibility problems with waxes and tackifiers. The immiscibility of ethylene-acrylic acid copolymers containing more than 5 mole percent acrylic acid has also been reported in adhesive compositions including a wood rosin tackifier and a petroleum wax in U.S. Pat. No. 3,869,416. Similarly, U.S. Pat. No. 4,284,541 reported unsuitable fluidity in a pressure sensitive adhesive composition of a tackifier and a modified ethylene-alpha-olefin copolymer to which had been grafted more than ten percent by weight of the copolymer of an unsaturated carboxylic acid.

Hot melt adhesive compositions containing a tackifier and an ethylene-unsaturated carboxylic acid copolymer in which the acrylic acid content is greater than twelve percent have heretofore required the addition of other ingredients, including oil as in U.S. Pat. No. 4,283,317, or an alkenyl succinic anhydride as in U.S. Pat. No. 4,325,853. In many applications, oils and waxes are undesirable because of reduced physical properties, chemical resistance and/or adhesion.

SUMMARY OF THE INVENTION

The present invention is a hot melt adhesive composition which consists essentially of (a) a copolymer of ethylene and an unsaturated carboxylic acid in which the acid content in the copolymer is from 12% to about 30%, preferably 14% to 25%, by weight of the copolymer, and (b) a thermoplastic tackifier which is compatible with the copolymer and which imparts substantial adhesive strength to the composition when the composition is applied as a hot melt adhesive to a substrate selected from aluminum, nylon, glass, galvanized steel, polypropylene, polyvinyl chloride and polyacrylonitrile-butadiene-styrene.

DETAILED DESCRIPTION OF THE PREFERRED EMBODIMENTS

The copolymer and the tackifier may be present in the composition in any relative proportion, but there is usually no advantage in doing so, in comparison with employing either the copolymer or tackifier alone, unless at least an approximate minimum amount of the other is present. Preferably, the composition contains, by weight of the composition, from about 20 to about 90% of the copolymer and from about 10 to about 80% of the tackifier, and especially 30 to 70% of the tackifier.

The copolymers useful in the hot melt adhesive composition of the invention are copolymers of ethylene and at least one unsaturated carboxylic acid. As used herein, the term copolymer also includes the salts, or ionomers of such copolymers. The acid may be any unsaturated carboxylic acid such as, for example, acrylic acid, methacrylic acid, ethacrylic acid, crotonic acid, vinyl acetic acid, maleic acid, fumaric acid or combinations thereof. The preferred unsaturated carboxylic acid is acrylic acid or methacrylic acid. The copolymer may contain from 12 to about 30 weight percent of the unsaturated carboxylic acid, preferably from about 14 to about 25 weight percent. The copolymer preferably has a melt flow value from about 100 (0.97 grams/10 minutes melt flow ASTM D-1238 condition 125/0.325) to about 7,000 (69 grams/10 minutes melt flow ASTM D-1238 condition 125/0.325), and especially from about 150 to about 4,000. As used herein, the term melt flow value refers to melt flow values standardized to correspond to ASTM D-1238 condition 190/2.16 unless otherwise indicated. Further, the copolymer may contain relatively minor amounts of other monomers known to be copolymerizable with ethylene and such unsaturated carboxylic acids. Methods for preparing such copolymers are well known.

The tackifiers suitable for use in the composition of the invention include any tackifier which is compatible with the copolymer and which imparts substantial adhesive strength to the composition when the composition is applied as a hot melt adhesive to a substrate of aluminum, nylon, glass, galvanized steel, polypropylene, polyvinyl chloride, or polyacrylonitrile-butadiene-styrene. As used herein, by the term tackifier is meant thermoplastic resins such as, for example, rosin and its derivatives, terpene resins, aromatic hydrocarbon resins and aliphatic hydrocarbon resins. These tackifiers typically have a ring and ball softening point of about 25°-180° C. These tackifiers and the methods for preparing them are well known in the art.

By compatible is meant that a molten mixture consisting substantially only of the tackifier and the copolymer is not subject to phase separation and does not exhibit a significant increase or decrease in viscosity upon standing. Thus, those tackifiers which exhibit phase separation when employed in the adhesive composition and those which result in the viscosity of the composition thickening significantly are incompatible.

It has been discovered that of the wide variety of tackifiers commercially available, while many are compatible with ethylene-unsaturated carboxylic acid copolymers with an acid content below 12 weight percent, few are actually compatible in hot melt adhesive compositions containing the aforementioned copolymers of ethylene and at least about 12 weight percent unsaturated carboxylic acid. Further, not all of the compatible tackifiers have been found to be useful in imparting adhesive strength to the composition when applied as a hot melt adhesive to the aforementioned substrates. By the term "imparts substantial adhesive strength" is meant that the composition containing both the copolymer and the tackifier exhibits an improvement in adhesion to at least one of the aforementioned substrates which is at least about twice, preferably at least about 5–10 times, that of the copolymer alone.

Commercially available tackifiers useful in the composition of the present invention have been found to be limited to two general classes, including: (1) rosins having an acid number above approximately 80, preferably above 120, most preferably about 150–160, and rosins which have been diluted with an aromatic hydrocarbon resin to have an acid number above approximately 80, preferably about 100; and (2) terpene resins, preferably alpha-pinene or dipentene resins, most preferably phenolic alpha-pinene resins. For reasons presently not understood, not all tackifiers from these classes are compatible, nor do all the compatible tackifiers from these classes impart adhesive strength to the composition. Thus, it is generally necessary to evaluate the suitability, i.e. compatibility and substantial improvement in adhesion, prior to use with a specific substrate of a particular tackifier in a hot melt adhesive.

Rosin is a complex mixture of primarily abietic and pimaric acids. For use in the invention, the rosin is preferably stabilized through modification by hydrogenation, dehydrogenation, polymerization, neutralization, or esterification with glycerine, glycerol, pentaerythritol or the like, and as used herein, the term "rosins" encompasses modified and unmodified rosins unless otherwise specified. Particularly suitable rosins are available commercially from Hercules Incorporated under the designations FORAL AX and STAYBELITE. These rosins have an acid number of about 160 and are believed to be rosins partially hydrogenated to at least about 50% of theoretical hydrogen uptake.

Rosins or modified rosins which have been diluted with an aromatic hydrocarbon resin to have an acid number above about 80 are also suitable. Such rosins are available from Hercules Incorporated under the designations PEXALYN A-500 and PEXALYN A-600. These tackifiers are believed to be rosin esters diluted with aromatic hydrocarbon resins including polymerized $C_9$ vinylaromatic compounds obtained as by-products of petroleum refining or cracking.

Compositions of the aforementioned ethylene-unsaturated carboxylic acid copolymers and the FORAL AX, STAYBELITE, PEXALYN A-500 or PEXALYN A-600 tackifiers exhibit improved adhesive properties when applied as a hot melt to one or more of the substrates selected from aluminum, nylon, glass, galvanized steel, polyvinyl chloride and polyacrylonitrile-butadiene-styrene.

Tackifiers sold under the trade names PICCOFYN A-135 and PICCOLYTE A-125 by Hercules Incorporated are exemplary of the terpene resins particularly suitable for use in the composition. PICCOFYN A-135 tackifier is believed to be a resin of alpha-pinene polymerized with phenol and has an acid and saponification number of about 0 and a ring and ball softening point of about 135° C. PICCOLYTE A-125 tackifier is believed to be a resin of polymerized alpha-pinene and has an acid and saponification number of about 0 and a ring and ball softening point of about 125° C. Compositions of the ethylene-unsaturated carboxylic acid copolymers and these terpene resins exhibit substantially improved adhesive properties when applied as a hot melt to polypropylene, particularly those containing the PICCOFYN A-135 tackifier.

The adhesive composition may further contain relatively minor amounts of ingredients such as colorants, antioxidants and other stabilizing additives which do not substantially adversely affect the compatibility of the system or the improved adhesion. The composition should not contain more than insubstantial quantities of incompatible tackifiers, or tackifiers or additives which reduce the improved adhesion of the composition, such as, for example, waxes and oils.

The hot melt adhesive composition of the invention is best illustrated by way of the following data:

TACKIFIER COMPATIBILITY

The compatibility of various commercially available tackifiers and waxes with ethylene-acrylic acid copolymers of varying acrylic acid content (8 and 20 wt.%) was determined by observation of phase separation or increase in viscosity. The tests were conducted by placing a composition having a 50-50 weight ratio of tackifier and the copolymer in a forced air oven at 177° C. The samples were allowed to sit in the oven for 1–1.5 hours and then stirred. They were then allowed to sit in the oven for a period of from about 12 to about 18 hours. The samples were then examined for phase separation. Using a glass stirring rod, the viscosity of the hot mixture was examined visually and physically for any significant increase or decrease in viscosity in comparison to the sample as originally mixed and stirred after the 1–1.5 hour period. Those mixtures in which phase separation occurred or those which thickened significantly were determined to be incompatible. The results of the compatibility testing are seen in Table I.

TABLE I

| Tackifier Class | Tackifier Trade Designation | Supplier | R & B Softening Point, °C. | Acid No. | Compatibility With Ethylene/Acrylic Acid | |
|---|---|---|---|---|---|---|
| | | | | | Cop. A[a] | Cop. B[b] |
| Natural Wood Rosins | K | Hercules[A] | 73 | 160 | C | C |
| | M | Hercules | 73 | 161 | C | C |
| | N | Hercules | 73 | 161 | C | C |
| | WG | Hercules | 72 | 162 | C | C |

TABLE I-continued

| Tackifier Class | Tackifier Trade Designation | Supplier | R & B Softening Point, °C. | Acid No. | Compatibility With Ethylene/Acrylic Acid | |
|---|---|---|---|---|---|---|
| | | | | | Cop. A[a] | Cop. B[b] |
| | VINSOL | Hercules | 112 | 95 | N | N |
| Tall Oil Rosins | SYLVATAC AC | Neville[B] | 78 | 178 | C | C |
| | SYLVATAC ACF | Neville | 78 | 153 | C | C |
| | SYLVATAC RX | Neville | 75 | 145 | C | C |
| | SYLVATAC 95 | Neville | 95 | 154 | C | C |
| | SYLVATAC 115 | Neville | 117 | 140 | C | C |
| | SYLVATAC 140 | Neville | 140 | 137 | C | C |
| | SYLVATAC 295 | Neville | 95 | 161 | C | C |
| | SYLVATAC 315 | Neville | 58 | 98 | C | C |
| Hydrogenated Rosins | FORAL AX | Hercules | 68 | 160 | C | C |
| | STAYBELITE | Hercules | 75* | 160 | C | C |
| | STAYBELITE 570 | Hercules | 76* | 157 | C | C |
| Dehydrogenated Rosins | RESIN 731-D | Hercules | 80* | 154 | C | C |
| Polymerized Rosins | DYMEREX | Hercules | 145 | 139 | C | C |
| | DYMEREX A700 | Hercules | 73 | 88 | C | C |
| | DYMEREX 724 | Hercules | 131 | 168 | C | C |
| | POLY-PALE | Hercules | 95 | 144 | C | C |
| | POLY-PALE II | Hercules | 95 | 145 | C | C |
| | RESIN NC-11 | Hercules | 82 | 153 | C | C |
| | RESIN 861 | Hercules | 82 | 153 | C | C |
| Rosin Esters | Ester Gum[1] | Hercules | 87 | 6 | N | N |
| | PENTALYN 344[2] | Hercules | 104 | 10 | C | N |
| | SYLVATAC 100NS | Sylvachem[C] | 99 | 9 | N | N |
| | ZONESTER 55[4] | Arizona[D] | 52 | 8 | N | N |
| | ZONESTER 75[4] | Arizona | 78 | 8 | N | N |
| | ZONESTER 85[5] | Arizona | 82 | 8 | N | N |
| | ZONESTER 100[6] | Arizona | 94 | 8 | N | N |
| Rosin Esters (Diluted) | PEXALYN A500[3] | Hercules | 86 | 98 | C | C |
| | PEXALYN A600[3] | Hercules | 104 | 92 | C | C |
| Hydrogenated Rosin Esters | FORAL 85[7] | Hercules | 82* | 9 | C | N |
| | FORAL 105[8] | Hercules | 104* | 12 | C | N |
| | HERCOLYN D[9] | Hercules | liquid | 7 | N | N |
| | HYDROTAC 114 | Hercules | liquid | 7 | C | C |
| | HYDROTAC 117 | Hercules | liquid | 7 | C | C |
| | PENTALYN H[10] | Hercules | 104* | 12 | C | N |
| | STAYBELITE[7] ESTER 5 | Hercules | 81* | 5 | C | N |
| | STAYBELITE[7] ESTER 10 | Hercules | 83* | 8 | C | C |
| | SYLVATAC 80N | Hercules | 85 | 7 | N | N |
| Dibasic Acid Modified Rosin Esters | CELLOLYN 102[12] | Hercules | 134* | 36 | N | N |
| | LEWISOL 28[13] | Hercules | 141* | 37 | N | N |
| | PENTAL 28 | Hercules | 129* | 35 | N | N |
| | PENTALYN 255 | Hercules | 171* | 190 | N | N |
| | PENTALYN 261 | Hercules | 171* | 205 | N | N |
| | PENTALYN 269 | Hercules | 177* | 200 | N | N |
| | PENTALYN 830[14] | Hercules | 118* | 78 | N | N |
| | PENTALYN 856[12] | Hercules | 131* | 140 | N | N |
| | PENTREX 821 | Hercules | 150* | 201 | N | N |
| Terpenes (Alpha-Pinene) | PICCOLYTE A115 | Hercules | 115 | <1 | C | C |
| | PICCOLYTE A125 | Hercules | 125 | <1 | C | C |
| Terpenes (Beta-Pinene) | PICCOLYTE S115 | Hercules | 115 | <1 | N | N |
| | PICCOLYTE S125 | Hercules | 125 | <1 | N | N |
| | ZONAREZ B-85 | Arizona | 85 | <1 | N | N |
| | ZONAREX M115 | Arixona | 105 | <1 | N | N |
| Terpenes (Dipentene) | PICCOLYTE D-100 | Hercules | 100 | <1 | C | C |
| | ZONAREZ 7085 | Arizona | 85 | <1 | C | N |
| | ZONAREZ 7100 | Arizona | 100 | <1 | C | N |
| | ZONAREZ 7115 | Arizona | 115 | <1 | C | N |
| | ZONAREZ 7125 | Arizona | 125 | <1 | C | N |
| Terpenes (Phenolic) | PICCOFYN A100 | Hercules | 100 | <1 | C | C |
| | PICCOFYN A125 | Hercules | 115 | <1 | C | C |
| | PICCOFYN A135 | Hercules | 135 | <1 | C | C |
| Other Polyterpenes | NEVTAC 100 | Neville | 102 | <1 | N | N |
| | NEVTAC 130 | Neville | 131 | <1 | N | N |
| | WINGTACK PLUS | Goodyear[E] | 94 | <1 | N | N |
| | WINGTACK 10 | Goodyear | 12 | <1 | C | N |
| | WINGTACK 95 | Goodyear | 98 | <1 | C | N |
| | ZONATAC 105 | Arizona | 105 | <1 | C | N |
| Aromatic Hydrocarbons | HERCOTAC AD4100-BHT | Hercules | 100 | <1 | N | N |
| | KRISTALEX 3100 | Hercules | 100 | <1 | N | N |
| | LX-1122 | Neville | 100 | <1 | N | N |
| | NEVEX 100 | Neville | 100 | <1 | N | N |
| | PICCO 5100 | Hercules | 100 | <1 | N | N |
| | PICCOLASTIC A75 | Hercules | 75 | <1 | N | N |

TABLE I-continued

| Tackifier Class | Tackifier Trade Designation | Supplier | R & B Softening Point, °C. | Acid No. | Compatibility With Ethylene/Acrylic Acid | |
|---|---|---|---|---|---|---|
| | | | | | Cop. A[a] | Cop. B[b] |
| | PICCOLASTIC D100 | Hercules | 100 | <1 | N | N |
| | PICCOMER 40 | Hercules | 37 | <1 | N | N |
| | PICCOTEX LC | Hercules | 75 | <1 | N | N |
| | PICCOTEX 75 | Hercules | 90 | <1 | N | N |
| Aromatic | NEVILLAC Hard | Neville | 95 | (170)+ | N | N |
| Hydro- | NEVILLAC Soft | Neville | 61 | (174)+ | N | N |
| carbons | NEVILLAC Special | Neville | 95 | (113)+ | N | N |
| (Phenolic modified) | NEVILLAC TS | Neville | liquid | (235)+ | N | N |
| Coumarone- | CUMAR LX-509 | Neville | 100 | <1 | N | N |
| Indenes | CUMAR P-25 | Neville | 25 | <1 | C | N |
| | CUMAR R-16 | Neville | 103 | <1 | N | N |
| | CUMAR MH-2½ | Neville | 100 | <1 | N | N |
| Aromatic | TERATE 101 | Hercules | 40* | 50 | N | N |
| Esters | TERATE 131 | Hercules | 90* | 80 | C | C |
| Aliphatic | ESCOREZ 1304 | Exxon[F] | 100 | <1 | C | N |
| Hydro- | ESCOREZ 1310 | Exxon | 94 | <1 | C | N |
| carbon | ESCOREZ 2101 | Exxon | 93 | <1 | C | N |
| Resins | LX-1035 | Neville | 170 | <1 | N | N |
| | PICCOTAC A-BHT | Hercules | 118 | <1 | N | N |
| | PICCOTAC B-BHT | Hercules | 100 | <1 | N | N |
| | PICCOTAC 95-BHT | Hercules | 95 | <1 | C | N |
| | RES D44 | Hercules | 18 | <1 | C | N |
| | RES D45 | Hercules | 33 | <1 | C | N |
| | RES D150 | Hercules | 65 | <1 | C | N |
| | RES D151 | Hercules | 78 | <1 | C | N |

Notes for Table I:
[1]Glycerol ester.
[2]Pentaerythritol ester.
[3]Rosin ester diluted with $C_9$ vinylaromatics.
[4]Glycerol ester of disproportionated tall oil rosin.
[5]Glycerol ester of tall oil rosin.
[6]Pentaerythritol ester of tall oil rosin.
[7]Glycerol ester of hydrogenated rosin.
[8]Pentaerythritol ester of hydrogenated rosin.
[9]Hydrogenated methyl ester of rosin.
[10]Pentaerythritol ester of partially hydrogenated rosin.
[11]Phthalate ester of technical hydroabietyl alcohol.
[12]Pentaerythritol ester of dibasic acid modified rosin.
[13]Maleic modified glycerol ester of rosin.
[14]Pentaerthritol ester of modified maleatred rosin.
[A]Hercules Incorporated.
[B]Neville Chemical Co.
[C]Sylvachem Corp.
[D]Arizona Chemical Co.
[E]Goodyear Tire and Rubber Co.
[F]Exxon Chemical Co., U.S.A.
*Hercules drop method.
+ Hydroxyl number.
[a]92 wt. % ethylene, 8 wt. % acrylic acid, melt flow value 700; N = incompatible, C = compatible.
[b]20 wt. % acrylic acid, melt flow value 500, obtained from The Dow Chemical company under the designation PRIMACOR ADHESIVE POLYMER 5983; N = incompatible, C = compatible.

ADHESIVE STRENGTH TESTING

Adhesive strengths of compositions containing 60 weight percent of a tackifier and 40 weight percent of an ethylene-acrylic acid copolymer containing 20% acid and having a melt flow value of 500 (obtained from The Dow Chemical Company under the trademark PRIMACOR ADHESIVE POLYMER 5983) were determined by the methods of peel strength and lap shear tests. Control I is the PRIMACOR 5983 ethylene-acrylic acid copolymer without any tackifier. Control II is a composition of 60% PEXALYN A-500 tackifier and 40% low density polyethylene resin (density 0.910, melt index 425).

Peel strength tests were used for film-forming substrates such as aluminum, nylon and polypropylene. Substrate strips measuring about 10 cm×20 cm were taped to a turntable and passed under a Meltex hot melt gun, Model MP-400, which extruded a single bead of the molten composition onto the substrate surface. An extrusion temperature of about 204° C. was used, and the orifice size (1.0–2.5 mm) and pressure was varied to obtain about a 0.5 gram bead weight of extruded resin per 20 cm. Within five seconds, another 10 cm×20 cm substrate was laid upon the first and an aluminum bar weighing about 433 grams and measuring about 20 cm×6 cm×1 cm was placed on the covered bead. The sample was allowed to cool for one minute before removing from the table. The samples were aged twenty-four hours before cutting 2.5 cm×10 cm test specimens. The peel strength was determined with an Instron tensile tester at a 180° peel angle.

Lap shear tests were used to determine the adhesion of the compositions to non-film forming substrates, including glass and galvanized steel. Samples were prepared by extruding a molten bead onto the end of one specimen, placing the end of another specimen on top the first and lightly pressing together while allowing to cool. Lap shear strength was determined using an Instron tensile tester equipped with an environmental chamber at 23° C.

TABLE II

| Control/Tackifier | Adhesive Strength | | | | |
|---|---|---|---|---|---|
| | Peel Strength (g/25 mm) Substrate | | | Lap Shear (Kg/cm²) Substrate | |
| | Aluminum | Nylon | Polypropylene | Glass | Galv. Steel |
| Control I[1] | 0 | 990 | 41 | 4.0 | 11.7 |
| Control II[2] | 0 | 0 | 45 | 0 | 0 |
| PEXALYN A-500[3] | 1960 | 2150 | 77 | 26.4 | 23.3 |
| STAYBELITE[4] | 1510 | 1340 | 100 | 21.8 | 31.6 |
| PICCOFYN A-135[5] | 0 | 0 | 450 | 0 | 0 |
| PEXALYN A-600[6] | 0 | 110 | 0 | 12.7 | 4.1 |
| PICCOLYTE A-125[7] | 0 | 0 | 82 | 4.6 | 0 |

Notes for Table II:
[1] Ethylene-acrylic acid copolymer containing 20 wt. % acrylic acid, melt flow value 500, obtained from The Dow Chemical Company under the designation PRIMACOR ADHESIVE POLYMER 5983.
[2] 60 wt % PEXALYN A-500 tackifier, 40 wt. % LDPE (density 0.910, melt index 425).
[3] 60 wt. % PEXALYN A-500 tackifier, 40 wt. % PRIMACOR ADHESIVE COPOLYMER 5983.
[4] 60 wt. % STAYBELITE tackifier, 40 wt. % PRIMACOR ADHESIVE COPOLYMER 5983.
[5] 60 wt. % PICCOFYN A-135 tackifier, 40 wt. % PRIMACOR ADHESIVE COPOLYMER 5983.
[6] 60 wt. % PEXALYN A-600 tackifier, 40 wt. % PRIMACOR ADHESIVE COPOLYMER 5983.
[7] 60 wt. % PICCOLYTE A-125 tackifier, 40 wt. % PRIMACOR ADHESIVE COPOLYMER 5983.

GENERAL ADHESION TESTS

The adhesive compositions were tested by extruding a control bead across the end of a plastic substrate as in the lap shear tests discussed above. The samples were peeled apart by hand and results were classified as poor (P), adhered to the substrate but were easy to separate, fair (F), a moderate amount of force was needed to separate the samples, and good (G), very difficult to separate. The results are listed in Table III.

TABLE III

| Control/Tackifier | General Adhesion | |
|---|---|---|
| | Substrate | |
| | ABS[1] | PVC[2] |
| Control I[3] | P | P |
| PEXALYN A-500[4] | G | G |
| STAYBELITE[5] | F | F |
| PEXALYN A-600[6] | F | F |
| PICCOLYTE A-125[7] | P | P |
| PICCOFYN A-135[8] | P | P |

Notes for Table III:
[1] Polyacrylonitrile-butadiene-styrene.
[2] Polyvinyl chloride.
[3] See note 1 from Table II.
[4] See note 3 from Table II.
[5] See note 4 from Table II.
[6] See note 6 from Table II.
[7] See note 7 from Table II.
[8] See note 5 from Table II.

The compatibility tests demonstrate that relatively few commercially available tackifiers are compatible with the ethylene-acrylic acid copolymers in which the acrylic acid content is in excess of 12% by weight. Note, for example, the general incompatibility of phenolic-modified aromatic hydrocarbon resins, aromatic hydrocarbon resins, aromatic ester resins and coumarone-indene resins. Also note the incompatibility of various rosin tackifiers with high acid numbers sold under the designations VINSOL, the PENTALYN's, and PENTREX 821. Nearly all of the tackifiers tested were otherwise compatible with low density polyethylene (0.930 density, melt index 280) and ethylene-vinyl acetate copolymer (18 wt.% vinyl acetate, melt flow value 500).

The results in Tables II and III demonstrate the utility of the compositions according to the invention. Compositions containing PEXALYN A-500 tackifier exhibit improved adhesive strength when applied as a hot melt to substrates of aluminum, nylon (two-fold), glass (six-fold), galvanized steel (two-fold), polyacrylonitrile-butadiene-styrene and polyvinyl chloride. Similarly, compositions containing STAYBELITE are useful with aluminum, glass (5-fold adhesive strength improvement) and galvanized steel (nearly three-fold adhesive strength improvement). Further, compositions containing PICCOFYN A-135 tackifier are useful as hot melt adhesives for polypropylene (eleven-fold adhesive strength improvement).

In addition, with a substantial number of the remaining tackifiers listed in Table I which are otherwise compatible with ethylene-acrylic acid copolymers in which the acrylic acid content is 20% by weight, when employed in hot melt compositions containing the copolymer, there is no or only marginal improvement of adhesive strength, or a reduction of adhesive strength.

While the hot melt adhesive composition of the invention is described above, many other variations will occur to those skilled in the art. It is intended that all such variations which fall within the scope and spirit of the appended claims be embraced thereby.

We claim:

1. A hot melt adhesive composition not subject to phase separation or significant viscosity changes upon standing in the molten state, consisting essentially of:
   (a) a copolymer of ethylene and at least one unsaturated carboxylic acid, said copolymer containing from 12 to about 30 weight percent of said acid; and
   (b) a tackifier which is compatible with said copolymer such that a molten mixture of said tackifier and said copolymer is not subject to phase separation and does not exhibit a significant increase or decrease in viscosity upon standing, and which imparts substantial adhesive strength to said composition when said composition is applied as a hot melt adhesive to a substrate of aluminum, nylon, glass, galvanized steel, polypropylene, polyvinyl chloride, or polyacrylonitrile-butadiene-styrene such that the adhesion of said composition to one or more of said substrates is at least twice that of said copolymer alone, said tackifier selected from the group consisting of:
      (i) rosins having an acid number of at least about 80 and rosins diluted with an aromatic hydrocarbon resin to have an acid number above approximately 80; and
      (ii) terpene resins.

2. The composition of claim 1 wherein said tackifier comprises from about 10 to about 80 percent by weight of said composition.

3. The composition of claim 1, wherein said unsaturated carboxylic acid is selected from the group consisting of: acrylic acid, methacrylic acid, ethacrylic acid, crotonic acid, vinyl acetic acid, maleic acid, fumaric acid and combinations and ionomers thereof.

4. The composition of claim 3, wherein said unsaturated carboxylic acid is acrylic acid.

5. The composition of claim 3, wherein said unsaturated carboxylic acid is methacrylic acid.

6. A hot melt adhesive composition not subject to phase separation or significant viscosity changes upon standing in the molten state, consisting essentially of:

(a) a copolymer of ethylene and at least one unsaturated carboxylic acid, said copolymer having a melt flow value of from about 100 to about 7000, said copolymer containing from 12 to about 30 weight percent of said acid, said acid selected from the group consisting of: acrylic acid, methacrylic acid, ethacrylic acid, crotonic acid, vinyl acetic acid, maleic acid, fumaric acid and combinations and ionomers thereof, said copolymer present in said composition in an amount of from about 20 to about 90 percent by weight; and (b) from about 10 to about 80 percent by weight of a tackifier which is compatible with said copolymer such that a molten mixture of said tackifier and said copolymer is not subject to phase separation and does not exhibit a significant increase or decrease in viscosity upon standing, and which imparts substantial adhesive strength to said composition when said composition is applied as a hot melt adhesive to a substrate of aluminum, nylon, glass, galvanized steel, polypropylene, polyvinyl chloride, or polyacrylonitrile-butadiene-styrene such that the adhesion of said composition to one or more of said substrates is at least twice that of said copolymer alone, said tackifier selected from the group consisting of:
(i) rosins having an acid number of at least about 80 and rosins diluted with an aromatic hydrocarbon resin to have an acid number above approximately 80; and
(ii) alpha-pinene and dipentene terpene resins.

7. The composition of claim 6, wherein said unsaturated carboxylic acid is acrylic or methacrylic acid.

8. The composition of claim 6, wherein said copolymer contains from about 14 to about 25 weight percent of said acid.

9. The composition of claim 8, wherein said copolymer has a melt flow value of from about 150 to about 4000.

10. The composition of claim 9, wherein said tackifier is present in an amount of from about 30 to about 70 percent by weight of said composition.

11. The composition of claim 10, wherein said tackifier is partially hydrogenated rosin having an acid number of about 160.

12. The composition of claim 10, wherein said tackifier is rosin diluted with an aromatic hydrocarbon resin to have an acid number of about 100.

13. The composition of claim 10, wherein said tackifier is alpha-pinene polymerized with phenol.

14. The composition of claim 10, wherein said tackifier is an alpha-pinene or dipentene resin.

15. A hot melt adhesive composition not subject to phase separation or significant viscosity changes upon standing in the molten state, consisting essentially of:
(a) from about 30 to about 70 percent by weight of the composition of a copolymer of ethylene and acrylic or methacrylic acid, said copolymer having a melt flow value of from about 150 to about 4,000 and comprising from about 14 to about 25 percent by weight of said copolymer of said acid; and
(b) from about 30 to about 70 percent by weight of a composition of a tackifier which is compatible with said copolymer such that a molten mixture of said tackifier and said copolymer is not subject to phase separation and does not exhibit a significant increase or decrease in viscosity upon standing, said tackifier selected from the group consisting of:
(i) rosin ester diluted with polymerized $C_9$ vinyl aromatics, wherein said tackifier has a ring and ball softening point of about 86 and an acid number of about 98, and said tackifier imparts substantial adhesive strength to the composition applied as a hot melt adhesive to substrates of aluminum, nylon, glass, galvanized steel, polyacrylonitrile-butadiene-styrene, and polyvinyl chloride;
(ii) partially hydrogenated rosin having an acid number of about 160, wherein said tackifier imparts substantial adhesive strength to the composition applied as a hot melt adhesive to substrates of aluminum, polypropylene, glass and galvanized steel; and
(iii) alpha-pinene polymerized with phenol, wherein said tackifier imparts substantial adhesive strength to the composition applied as a hot melt to a substrate of polypropylene.

16. The composition of claim 15, wherein said tackifier is said diluted rosin ester.

17. The composition of claim 15, wherein said tackifier is said diluted rosin ester.

18. The composition of claim 15 wherein said adhesive strength imparted by said tackifier is at least about 5 times that of said copolymer alone when said substrate is aluminum, polypropylene or glass.

19. The composition of claim 15, wherein said adhesive strength imparted by said tackifier is at least about ten times that of said copolymer alone when said substrate is polypropylene.

* * * * *